US010273638B1

(12) United States Patent
Penland, Jr.

(10) Patent No.: US 10,273,638 B1
(45) Date of Patent: Apr. 30, 2019

(54) LAMINATED MATS WITH CLOSED AND STRENGTHENED CORE LAYER

(71) Applicant: QUALITY MAT COMPANY, Beaumont, TX (US)

(72) Inventor: Joe Penland, Jr., Beaumont, TX (US)

(73) Assignee: Quality Mat Company, Beaumont, TX (US)

( * ) Notice: Subject to any disclaimer, the term of this patent is extended or adjusted under 35 U.S.C. 154(b) by 0 days.

(21) Appl. No.: 15/935,733

(22) Filed: Mar. 26, 2018

(51) Int. Cl.
*E01C 9/08* (2006.01)
*B32B 3/18* (2006.01)
*B32B 3/06* (2006.01)
*B32B 7/08* (2019.01)
*E01C 11/00* (2006.01)
*E01C 5/14* (2006.01)
(Continued)

(52) U.S. Cl.
CPC ........... *E01C 9/086* (2013.01); *B32B 3/06* (2013.01); *B32B 3/14* (2013.01); *B32B 3/18* (2013.01); *B32B 7/08* (2013.01); *B32B 7/12* (2013.01); *B32B 21/042* (2013.01); *B32B 21/08* (2013.01); *B32B 21/13* (2013.01); *E01C 5/14* (2013.01); *E01C 5/18* (2013.01); *E01C 5/20* (2013.01); *E01C 5/22* (2013.01); *E01C 11/005* (2013.01); *E01C 2201/12* (2013.01)

(58) Field of Classification Search
CPC ... E01C 9/086; E01C 9/08; E01C 5/00; E01C 11/24
See application file for complete search history.

(56) References Cited

U.S. PATENT DOCUMENTS 2,836,529 A 5/1958 Morris
3,078,621 A 2/1963 Hinds
(Continued)

FOREIGN PATENT DOCUMENTS

CA 2 233 776 A1 12/1999
CA 2 557 701 A1 2/2008
(Continued)

OTHER PUBLICATIONS

Richard West Co., Inc., Steel Reinforced Crane Mat, downloaded from the internet on May 11, 2016 (see http://www.richardwestcompany.com/products.html).
(Continued)

*Primary Examiner* — Abigail A Risic
(74) *Attorney, Agent, or Firm* — Winston & Strawn LLP

(57) ABSTRACT

A laminated mat for use as the temporary surface at a construction site or roadway leading thereto. This mat includes at least three layers of boards in a top layer, at least one core layer and a base layer. Preferably, each layer is rectangular. The top and base layers each include a plurality of parallel boards of substantially equal length that are made of oak or other hardwoods, or of plastic or elastomeric materials. The core layer includes a plurality of parallel boards of substantially equal length that are made of chemically treated softwood, encapsulated softwood, or of plastic or elastomeric materials, with the boards arranged to be perpendicular to the boards of the top layer, and configured so that adjacent boards in the core layer engage, contact and abut each other to minimize or eliminate space between adjacent boards to improve the strength of the core layer.

20 Claims, 5 Drawing Sheets

(51) Int. Cl.

| | | |
|---|---|---|
| *E01C 5/20* | (2006.01) | |
| *E01C 5/18* | (2006.01) | |
| *E01C 5/22* | (2006.01) | |
| *B32B 3/14* | (2006.01) | |
| *B32B 7/12* | (2006.01) | |
| *B32B 21/04* | (2006.01) | |
| *B32B 21/08* | (2006.01) | |
| *B32B 21/13* | (2006.01) | |

(56) References Cited

U.S. PATENT DOCUMENTS

| | | |
|---|---|---|
| 3,985,169 A | 10/1976 | Chow |
| 4,324,037 A | 4/1982 | Grady, II |
| 4,462,712 A | 7/1984 | Penland, Sr. |
| 4,600,336 A | 7/1986 | Waller, Jr. |
| 4,629,358 A | 12/1986 | Springston et al. |
| 4,875,800 A | 10/1989 | Hicks |
| 4,889,444 A | 12/1989 | Pouyer |
| 4,932,178 A | 6/1990 | Mozingo |
| 5,020,937 A | 6/1991 | Pouyer |
| 5,032,037 A | 7/1991 | Phillips |
| 5,050,366 A | 9/1991 | Gardner et al. |
| 5,113,632 A | 5/1992 | Hanson |
| 5,139,845 A | 8/1992 | Beckerman et al. |
| 5,163,776 A | 11/1992 | Pouyer |
| 5,241,163 A | 8/1993 | Vachtsevanos et al. |
| 5,273,373 A | 12/1993 | Pouyer |
| 5,342,260 A | 8/1994 | Markland |
| 5,402,609 A | 4/1995 | Kelley, Jr. |
| 5,535,694 A | 7/1996 | Czipri |
| 5,653,551 A | 8/1997 | Seaux |
| 5,679,191 A | 10/1997 | Robinson |
| 5,822,944 A | 10/1998 | Penland, Sr. |
| 5,888,612 A | 3/1999 | Needham et al. |
| 5,930,967 A | 8/1999 | Stoehr et al. |
| 5,985,415 A | 11/1999 | Giltner |
| 6,007,271 A | 12/1999 | Cole et al. |
| 6,023,900 A | 2/2000 | Stoehr et al. |
| 6,214,428 B1 | 4/2001 | Henderson |
| 6,231,950 B1 | 5/2001 | Giltner |
| 6,231,994 B1 | 5/2001 | Totten |
| 6,259,373 B1 | 7/2001 | Ghahramani |
| 6,365,650 B1 | 4/2002 | Chen et al. |
| 6,380,309 B1 | 4/2002 | Parker et al. |
| 6,450,235 B1 | 9/2002 | Lee |
| 6,474,905 B1 | 11/2002 | Smith, Jr. |
| 6,497,956 B1 | 12/2002 | Phillips et al. |
| 6,511,257 B1 | 1/2003 | Seaux et al. |
| 6,649,110 B1 | 11/2003 | Seaux et al. |
| 6,662,508 B1 | 12/2003 | Else |
| 6,695,527 B2 | 2/2004 | Seaux et al. |
| 6,722,831 B2 | 4/2004 | Rogers |
| 6,763,873 B2 | 7/2004 | Lee |
| 6,821,623 B2 | 11/2004 | Kvesic |
| 6,945,732 B2 | 9/2005 | Renick |
| 7,137,226 B2 | 11/2006 | Fiutak et al. |
| 7,303,800 B2 | 12/2007 | Rogers |
| 7,404,690 B2 | 7/2008 | Lukasik et al. |
| 7,413,374 B2 | 8/2008 | Rogers et al. |
| 7,427,172 B2 | 9/2008 | Lukasik |
| D609,956 S | 2/2010 | Lukasik |
| 7,818,929 B2 | 10/2010 | Fiutak et al. |
| 7,934,885 B2 | 5/2011 | Fournier |
| 8,061,929 B2 | 11/2011 | Dagesse |
| 8,070,004 B2 | 12/2011 | Williams et al. |
| 8,088,477 B2 | 1/2012 | Curtis et al. |
| 8,382,393 B1 | 2/2013 | Phillips |
| 8,424,577 B2 | 4/2013 | Poutanen |
| 8,613,373 B2 | 12/2013 | Holtby et al. |
| 8,734,263 B2 | 5/2014 | Ford et al. |
| 8,784,001 B1 | 7/2014 | Phillips |
| 8,857,125 B2 | 10/2014 | Lu et al. |
| 8,906,480 B2 | 12/2014 | Fiutak et al. |
| 8,936,073 B1 | 1/2015 | Phillips |
| 9,133,598 B2 | 9/2015 | Hsu |
| 9,315,951 B1 | 4/2016 | Penland, Jr. |
| 9,347,184 B2 | 5/2016 | Evelyn |
| 9,476,164 B2 | 10/2016 | Penland, Jr. et al. |
| 9,915,036 B2* | 3/2018 | Penland, Jr. ............ B32B 21/12 |
| 2002/0110418 A1 | 8/2002 | Renick |
| 2003/0192804 A1 | 10/2003 | Gheblikian |
| 2004/0037644 A1 | 2/2004 | Renick |
| 2004/0071914 A1 | 4/2004 | Fiutak et al. |
| 2004/0253055 A1 | 12/2004 | Polivka, Jr. |
| 2005/0022363 A1 | 2/2005 | Harrison |
| 2006/0034654 A1 | 2/2006 | Sanders |
| 2006/0179733 A1 | 8/2006 | Padmanabhan |
| 2006/0260264 A1 | 11/2006 | Reynolds |
| 2006/0265976 A1 | 11/2006 | Fiutak |
| 2007/0056228 A1 | 3/2007 | Penland, Sr. et al. |
| 2007/0237581 A1 | 10/2007 | Lukasik et al. |
| 2008/0028703 A1 | 2/2008 | Brandstorm |
| 2008/0085154 A1 | 4/2008 | Lukasik |
| 2008/0152861 A1 | 6/2008 | Barker |
| 2008/0292397 A1 | 11/2008 | Farney et al. |
| 2009/0087261 A1 | 4/2009 | Fournier |
| 2009/0301004 A1 | 12/2009 | Dagesse |
| 2011/0233363 A1 | 9/2011 | Wold |
| 2011/0280657 A1 | 11/2011 | Martinez |
| 2012/0063844 A1 | 3/2012 | Wold |
| 2013/0156501 A1 | 6/2013 | Hemphill |
| 2013/0284872 A1 | 10/2013 | Tubbs |
| 2013/0306804 A1 | 11/2013 | Holtby et al. |
| 2013/0318896 A1 | 12/2013 | Rogers |
| 2014/0154462 A1 | 6/2014 | Fiutak et al. |
| 2014/0183319 A1 | 7/2014 | Tubbs |
| 2014/0186573 A1 | 7/2014 | Tubbs |
| 2014/0193196 A1 | 7/2014 | Fournier |
| 2014/0199119 A1 | 7/2014 | Stasiewich |
| 2014/0205377 A1 | 7/2014 | Hill |
| 2014/0341649 A1 | 11/2014 | Bryan et al. |
| 2016/0222597 A1* | 8/2016 | Penland, Jr. ............ E01C 9/086 |
| 2016/0355993 A1* | 12/2016 | Tubbs ..................... B66C 23/78 |
| 2017/0037581 A1 | 2/2017 | Sterling et al. |
| 2017/0037582 A1* | 2/2017 | Penland, Jr. ............ E01C 5/22 |
| 2017/0145639 A1* | 5/2017 | Sterling ................. E01C 9/086 |

FOREIGN PATENT DOCUMENTS

| | | |
|---|---|---|
| CA | 2 637 470 A1 | 1/2010 |
| EP | 1 600 558 A1 | 11/2005 |
| EP | 2 705 950 A1 | 3/2014 |
| WO | 95/25076 A1 | 9/1995 |
| WO | 2006/002507 A1 | 1/2006 |
| WO | 2006/048654 A1 | 5/2006 |
| WO | 2007/112537 A1 | 10/2007 |

OTHER PUBLICATIONS

Forest Products Laboratory. Wood Handbook—Wood as an Engineering Material—4. Mechanical Properties of Wood. U.S. Department of Agriculture. Online version available at: app.knovel.com/hotlink/pdf/id:kt0052LP04/wood-handbook-wood-an/mechanical-properties (1999).

"Inflammable". Wiktionary. Archived Sep. 6, 2014.

Quality Mat Company website: http://www.qmat.com/ (2015).

"Crane Mat," retrieved from http://www.qmat.com/products/crane-mats/ (2015).

Invitation to Pay Additional Fees, Appl. No. PCT/US2016/020067 dated Jun. 20, 2016.

International Search Report and Written Opinion, Appl. No. PCT/US2016/020067 dated Aug. 8, 2016.

International Search Report and Written Opinion, Appl. No. PCT/US2016/020081 dated Jun. 2, 2016.

International Search Report and Written Opinion, Appl. No. PCT/US2017/014658 dated Jul. 10, 2017.

U.S. Appl. No. 14/839,888, Non-Final Rejection dated Nov. 6, 2015.

U.S. Appl. No. 14/839,888, Notice of Allowance dated Jan. 14, 2016.

(56) References Cited

OTHER PUBLICATIONS

U.S. Appl. No. 14/839,888, Notice of Allowability dated Feb. 19, 2016.
U.S. Appl. No. 15/056,212, Non-Final Rejection dated Apr. 22, 2016.
U.S. Appl. No. 15/056,212, Notice of Allowance dated Jun. 9, 2016.
U.S. Appl. No. 15/056,212, Notice of Allowability dated Aug. 11, 2016.
U.S. Appl. No. 15/056,212, Notice of Allowability dated Aug. 25, 2016.
U.S. Appl. No. 15/081,340, Non-Final Rejection dated May 6, 2016.
U.S. Appl. No. 15/081,340, Notice of Allowance dated Jun. 15, 2016.
U.S. Appl. No. 15/081,340, Notice of Allowability dated Sep. 1, 2016.
U.S. Appl. No. 15/081,340, Notice of Allowability dated Sep. 23, 2016.
U.S. Appl. No. 15/155,685, Non-Final Rejection dated Oct. 3, 2017.
U.S. Appl. No. 15/155,685, Final Rejection dated Feb. 9, 2018.
U.S. Appl. No. 15/155,685, Advisory Action dated Mar. 16, 2018.
U.S. Appl. No. 15/244,483, Non-Final Rejection dated Jun. 19, 2017.
U.S. Appl. No. 15/244,483, Notice of Allowance dated Jul. 20, 2017.
U.S. Appl. No. 15/244,614, Non-Final Rejection dated Dec. 15, 2016.
U.S. Appl. No. 151244,614, Final Rejection dated Mar. 9, 2017.
U.S. Appl. No. 15/244,614, Notice of Allowance dated Apr. 13, 2017.
U.S. Appl. No. 15/244,614, Notice of Allowability dated Apr. 27, 2017.
U.S. Appl. No. 15/377,545, Non-Final Rejection dated Feb. 10, 2017.
U.S. Appl. No. 15/377,545, Notice of Allowance dated Feb. 28, 2017.
U.S. Appl. No. 15/377,545, Corrected Notice of Allowability dated Mar. 10, 2017.
U.S. Appl. No. 15/621,989, Non-Final Rejection dated Aug. 25, 2017.
U.S. Appl. No. 15/621,989, Notice of Allowance dated Oct. 25, 2017.

* cited by examiner

LAMINATED MATS WITH CLOSED AND STRENGTHENED CORE LAYER

BACKGROUND

The present invention relates to a reusable system for the construction of roadways and equipment support surfaces in areas having poor ground integrity characteristics. More particularly, the present invention relates to a system of durable laminated mats which can be interconnected to form roadways and/or equipment support surfaces. More particularly still, the present invention relates to a reusable system of laminated mats which can be quickly and easily positioned in a single layer to form roadways and/or equipment support surfaces, and which can thereafter be easily removed and stored until needed again.

In remote and unstable environments, a stable roadway (or any roadway) often does not exist, such that temporary roadways are assembled by aligning planks, boards or mats along the desired path. The mats provide temporary structures for various construction projects as well as for use in environmental or disaster cleanup projects. These mats enable trucks and other equipment to drive over, store equipment on, or create campsites on otherwise unstable, soft or moist land or damaged areas by providing a relatively level and stable surface.

Mats for this use are generally known in the art. In particular, two and three layer laminated mats have been used for many years. These mat, as disclosed in U.S. Pat. No. 4,462,712 for example, are made from a plurality of boards with spacing between each of the boards in each layer.

Similarly, US patent application US 2017/0037581 A1 discloses a crane mat having a plurality of panels of lumber positioned in alternating transverse directions with respect to one another, where the top and bottom panels are oriented parallel to the direction of vehicular traffic. The top and bottom panels may include a plurality of spaced apart grooves extending longitudinally from a first longitudinal end of the crane mat to a second longitudinal end of the crane mat for enhancing traction of a vehicle when traversing across the crane mat by transporting rain or moisture off the mat, or for receiving mud or other debris. The crane mat may include a plurality of edge protectors positioned on respective sides of the crane mat to protect the crane mat from handling damage. In various embodiments, the crane mat may be manufactured using either softwood, hardwood, or any combination of softwood and hardwood.

While conventional wood mats of this type provide useful service at a reasonable cost, the wood core can deteriorate over time due to moisture causing gradual rotting and degradation of the wood material. This causes the mat to be discarded, because unlike some of the other materials that are used on the upper and lower layers of the mat, the core cannot be replaced without essentially making an entirely new mat.

Thus, there is a need for improvement in mat construction in order to provide better strength and longer service lives. There is also a need for mats having improved resistance to abuse and damage as well as to provide reusable and replaceable components to further extend their service lives. There are also needs for better lifting elements for transport, installation and retrieval of industrial mats. The present invention now provides new laminated mat constructions that meet these needs.

SUMMARY OF THE INVENTION

The present invention relates to a laminated mat for use as the temporary surface at a construction site or roadway leading thereto and adapted for supporting construction equipment. This mat includes at least three layers of boards comprising a top layer, a core layer and a base layer. Preferably, each layer is rectangular.

The rectangular top layer has a first end and an opposed second end, and comprises a plurality of parallel boards of substantially equal length that are made of wood which is preferably oak or other hardwoods, engineered wood or of plastic or elastomeric materials.

The rectangular core layer comprising a plurality of parallel boards of substantially equal length that are made of chemically treated softwood, encapsulated softwood, or of plastic or elastomeric materials, with the boards extending between the first and second ends of the top layer, arranged to be perpendicular to the boards of the top layer, and configured so that adjacent boards in the core layer engage, contact and abut each other to minimize or eliminate space between adjacent boards to improve the strength of the core layer.

The rectangular base layer has a first end and an opposed second end which are aligned with the first and second ends of the top layer. This base layer comprises a plurality of parallel boards of substantially equal length that are spaced from each other and are made of oak or other hardwoods, engineered wood or of plastic or elastomeric materials. Also, the boards of the base layer are oriented parallel to the boards of the top layer and perpendicular to the boards of the core layer.

At least two or three boards of the base layer are longitudinally offset to the other boards to form at a first end of the mat two or three protruding board ends and to correspondingly form at a second end of the mat two or three open slots such that the protruding board ends of one mat can engage the open slots of a similarly configured longitudinally adjacent mat to interlock the mats together to form the temporary surface at the construction site.

Advantageously, the boards of the layers are attached together by bolting or other fasteners. In particular, the boards have a thickness of between about 1 and about 4 inches and a width of between about 4 and about 16 inches, and the mat has a width of between about 4 feet and about 12 feet and a length of between about 10 and about 60 feet.

In this laminated mat, the boards of the core layer may have sides that are cut, planed, or molded to facilitate abutting and complete side contact between adjacent boards. Alternatively, the boards of the core layer may have sides that are perpendicular to upper and lower surfaces of the boards to facilitate abutting and complete side contact between adjacent boards. Furthermore, adjacent boards of the core layer may have sides forming angles that are other than 90 degrees with respect to upper and lower board surfaces to facilitate abutting and complete side contact of adjacent boards. Preferably, the boards of the core layer have 90 degree sides at the front and rear ends of the mat.

In yet another embodiment, adjacently positioned boards in the core layer have interconnecting side structures to provide joining of adjacent boards together, with one board comprising a side groove or multiple grooves and with the adjacent board having a side that includes one or more protrusions that are configured to snugly fit into the one or more grooves. Additionally, adjacent boards of the core layer may have sides that are adhered together by an adhesive.

Preferably, each board in the core layer is rectangular and is made of treated pine that is pressure treated with chemical preservatives that resist rot, decay and termites and wherein the top and base layers include rectangular boards made of oak. Alternatively, each board in the core layer may be made of recycled plastic material comprising a polymer and rice hulls or recycled plastic carpet fibers and wherein the top and base layers include rectangular boards made of oak. Advantageously, each board in the core layer may be rectangular and made of treated pine that is pressure treated with one or more chemical preservatives that resist rot, decay and termites. The boards of the top and base layers can be wood or engineered wood but also can be rectangular boards made of recycled plastic materials comprising a polymer and rice hulls or recycled plastic carpet fibers so that the service life of the mat is further increased.

BRIEF DESCRIPTION OF THE DRAWINGS

Preferred features of the invention are now illustrated by way of the appended drawing figures, wherein.

DETAILED DESCRIPTION OF THE INVENTION

Figure 1:
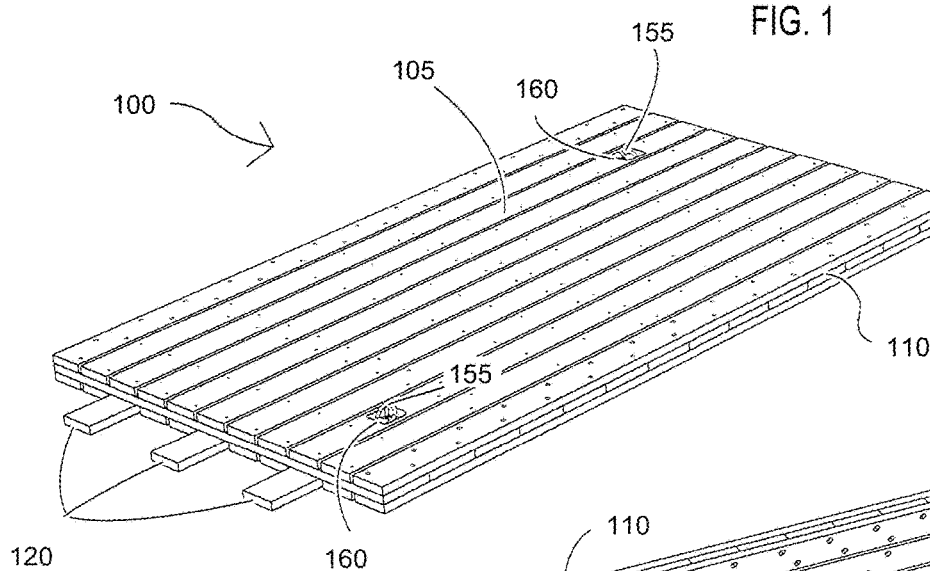
FIG. 1 is a top perspective view of a three layer laminated mat in accordance with the present invention.

The present invention now provides various improved industrial mats that have improved properties, better resistance to impact, abrasion and abuse, and which facilitate lifting or installation and recovery of the mats.

Certain terms that are used herein are defined hereinbelow to assist in the understanding of the invention.

The term "laminated mat" is intended to cover relatively large mats having widths of at least about 4 feet with lengths running from about 4 feet to 10, 12, 14, 16, 20, 40 or even as much as 60 feet or more. These mats comprise from 3 to 10 layers of boards as noted herein. The boards of most layers typically have thicknesses of from 1 to 4 inches to as much as 6 inches if desired and usually have rectangular cross sections. The boards of the core layers can have other configurations as noted herein. Preferred mat and board dimensions and board configurations are described throughout the specification.

The term "substantially" is used for its ordinary meaning to indicate that the dimensions are not precise or exact. A skilled artisan can readily determine what tolerances are acceptable to provide a surface that is considered to be flat based upon the assembly of the boards of the top and base layers and the type of service that the mat is expected to provide. There is no requirement that the boards be completely flush with each other along the top and bottom surfaces of the mat. Typically, the term "substantially' will mean that the top surfaces of the beams and elongated members can vary by as much as a few inches although in the more preferred embodiments the variance is less than 1 inch.

Additionally, all dimensions recited herein are approximate and can vary by as much as ±10% to in some case ±25%. In some situations, the term "about" is used to indicate this tolerance. And when the term "about" is used before reciting a range, it is understood that the term is applicable to each recited value in the range. Often, the craftsmanship and engineering procedures that are followed in construction of these mats minimize these tolerances as much as possible or industrially practical.

In one embodiment, the core layer(s) of mats possess better environmental resistance due to the use of environmentally resistant materials. The term "environmentally resistant material" means a material that is not subject to deterioration by water, moisture or other environmental conditions when compared to a conventional hardwood material such as white oak that is commonly used for such mats. This term includes thermoplastic and thermosetting materials as disclosed herein along with elastomers. When a softwood is used in the core layer, it is chemically treated to improve environmental resistance. For example, a softwood such as pine is pressure treated with chemical preservatives that resist rot, decay and termites. These preservatives are generally known but have not been previously used in a laminated mat. This preserves the boards of the core layer to provide a much longer service life.

A softwood such as pine but works well this particular combination of materials, because the chemical treatment enables the wood to resist environmental deterioration. Pine and other softwoods have some similar properties to hardwood such as oak but are not as resistant to impact and abrasion. As an example, the use of pine is advantageous for the core layer(s) as it is readily available in the desired lengths and if prepared as noted herein possesses sufficient strength to allow re-use of the core layer when the boards of the outer layers need to be replaced. Pine is more plentiful and regrows at a faster rate than hardwoods, typically around 15 years compared to 100 years for hardwoods. As noted, pine can be treated for long life whereas oak and hardwoods cannot.

One type of preferred chemical treatment for softwoods such as pine is HLS CCA Pressure Treated softwood lumber, which is available from Hixson Lumber Sales, Inc., Pine Bluff, Ak. 71611. This treatment is warranted for a period of 40 years from the date of purchase. Another preferred treatment for Southern Yellow Pine is Micronized Copper Azole (MCA), which is available from Great Southern Wood-LA, Inc., Mansura, La. 71350. This treatment is applied in accordance with International Code Council Evaluation Service Report 2240 and is approved for ground or fresh water contact. This treatment is applied to the wood after manufacture to size and prior to assembly in the mats. The company provides a lifetime limited warranty during use against structural failure due to rot, fungal decay, or termite attack. Accordingly, the treated softwood of the present invention is designed to provide a conservative service life of at least 25 years without experiencing rotting, fungal decay or termite attack.

When hardwoods are used for the boards of the top and base layers, the hardwood species may include at least one of oak, maple, hickory, hackberry, and cherry, and preferably oak. The softwood species that are suitable for the invention include at least one of spruce, pine, fir, southern yellow pine, and hemlock with pine preferred. And as noted, the softwood would be chemically treated to extend its service life by making it more resistant to environmental conditions that are typically experienced.

A similar increase in service life is obtainable with the use of boards of plastic or elastomeric material. This enables the core layer to be reused in a regenerated mat that has the wood boards of the top and base layers replaced when necessary. And for further resistance, all of the boards of the various layers of the mat can be made of plastic or elastomeric materials.

A wide range of thermoplastic or polymeric materials are suitable for this purpose. These materials would be molded or cast to the desired size, shape and thickness of the boards. Useful materials include:

Acrylonitrile butadiene styrene (ABS)
Acrylic (PMA)
Celluloid
Cellulose acetate
Cyclo olefin Copolymer (COC)
Ethylene-Vinyl Acetate (EVA)
Ethylene vinyl alcohol (EVOH)
Fluoroplastics (PTFE, alongside with FEP, PFA, CTFE, ECTFE, ETFE)
Ionomers
Kydex, a trademarked acrylic/PVC alloy
Liquid Crystal Polymer (LCP)
Polyacetal (POM or Acetal)
Polyacrylates (Acrylic)
Polyacrylonitrile (PAN or Acrylonitrile)
Polyamide (PA or Nylon)
Polyamide-imide (PAI)
Polyaryletherketone (PAEK or Ketone)
Polybutadiene (PBD)
Polybutylene (PB)
Polybutylene terephthalate (PBT)
Polycaprolactone (PCI)
Polychlorotrifluoroethylene (PCTFE)
Polyethylene terephthalate (PET)
Polycyclohexylene dimethylene terephthalate (PC (PC)T)
Polycarbonate
Polyhydroxyalkanoates (PHAs)
Polyketone (PK)
Polyethylene (PE)
Polyetheretherketone (PEEK)
Polyetherketoneketone (PEKK)
Polyetherimide (PEI)
Polyethersulfone (PES)—see Polysulfone
Polyethylenechlorinates (PEC)
Polyimide (PI)
Polylactic acid (PLA)
Polymethylpentene (PMP)
Polyphenylene oxide (PPO)
Polyphenylene sulfide (PPS)
Polyphthalamide (PPA)
Polypropylene (PP)
Polystyrene (PS)
Polysulfone (PSU)
Polytrimethylene terephthalate (PTT)
Polyurethane (PU)
Polysulfone (PSU)
Polytrimethylene terephthalate (PTT
Polyvinyl chloride (PVC)
Polyvinylidene chloride (PVDC)
Styrene-acrylonitrile (SAN)

The boards may also be made of an elastomeric material. The elastomers are usually thermosets (requiring vulcanization) but may also be thermoplastic. Typical elastomers include:

Unsaturated rubbers that can be cured by sulfur vulcanization—these are preferred from a strength and hardness standpoint:
Natural polyisoprene: cis-1,4-polyisoprene natural rubber and trans-1,4-polyisoprene gutta-percha;
Synthetic polyisoprene;
Polybutadiene;
Chloroprene rubber, i.e., polychloroprene;
Butyl rubber (i.e., copolymer of isobutylene and isoprene) including halogenated butyl rubbers (chloro butyl rubber; bromo butyl rubber);
Styrene-butadiene Rubber (copolymer of styrene and butadiene); and
Nitrile rubber (copolymer of butadiene and acrylonitrile).
Saturated (i.e., non-vulcanizable) rubbers include:
Ethylene propylene rubber (EPM);
Ethylene propylene diene rubber (EPDM);
Epichlorohydrin rubber;
Polyacrylic rubber;
Silicone rubber;
Fluorosilicone Rubber;
Fluoroelastomers;
Perfluoroelastomers;
Polyether block amides; and
Chlorosulfonated polyethylene.

The elastomeric, thermoplastic or thermosetting materials disclosed herein can also be provided with conventional fillers to increase weight and hardness. They also can be reinforced with particulates, fibers such as glass, fabric or metal screening or scrim to reduce elongation and provide greater rigidity.

Additional materials for the environmentally resistant boards of the core layer(s) include:
various thermosetting materials, including Epoxy, Melamine formaldehyde (MF), Phenol-formaldehyde (PF), Polyester, Polyurethane (PU), Polyimide (PI), Silicone (SI) or Urea formaldehyde (UF). These materials are molded into boards and can be reinforced with fibers or filler (carbon, glass, metal, etc.);
a thermoplastic material (any of the various plastics mentioned hereinabove) and in particular, HDPE, PET and SBR as disclosed in U.S. Pat. No. 6,380,309; and
a reinforced plastic composite material as disclosed in U.S. Pat. No. 4,629,358.

A preferred plastic material is a recycled plastic material. A particular type of recycled plastic material is made of fibers and polymers and optionally an inorganic filler, and is made by mixing the materials together under pressure under conditions sufficient to melt the plastic and then to extrude the molten mixture. This is next process by rollers to the desired thickness and width. Typically, the final product is a board that can be 1 to 2 inches thick and 6 to 18 inches in width. Depending upon the processing equipment, widths of up to 48 inches or more, and thicknesses from ¼ to 3 inches are possible. The boards made from this process are called Miura board and are available from Athyron, LLC, Kountze, Tex. 77625.

The fibers that can be used in this board can be any type of animal, vegetable or synthetic material and includes rice hulls, oats, recycled carpets made of nylon, polyester or other synthetic fibers, wool or cotton fibers, or raffia or other materials. Animal hair or leather can also be used. In some cases, the fibers themselves or recycles products containing them also include inorganic particles such as silica (in the case of rice hulls) or calcium carbonate (from the backing of recycled carpet fibers.

Miura boards typically contain between 25 and 35% of fibers and 65 to 75% of the polymer or polymer mixture. Typical polymers include high density polyethylene (HDPE) or polypropylene (PP) but other thermoplastic materials can be used if desired. Typically, a mixture that includes 25 to 75% HDPE and 75 to 25% PP is used.

The boards can also contain an additional amount of up to 25% of a mineral filler, such as calcium carbonate (or ground marble) based on the weight of the recycle material and polymer. In many cases, the fibers are associated with a mineral. For example, raffia contains up to 20% by weight calcium carbonate, while rich hulls contain about 16% by weight silica. Recycled carpeting contain calcium carbonate or other minerals in the backing, and all of these materials are shredded or comminuted to smaller sizes so that they can be mixed with the polymer before being extruded. When if the amount of mineral filler associated with the fibers is insufficient or the type of fiber does not contain a mineral component, then preferably from 1 to 20% of a mineral such as silica, calcium carbonate or others can be added to improve the toughness and surface roughness of the final boards. The texture of such products is on the order of a sandpaper which contributes to the good footing when moving across the boards when they are used in a mat.

The resultant recycled plastic board has a similar appearance to an oak board but with the additional advantage that it does not absorb fluids. Miura board is an extremely durable composite material that looks like wood yet greatly outperforms it in many respects. It is manufactured by a proprietary process of blending, extruding, and laminating a 100% recycled mix of thermoplastic polymers and natural or synthetic fibers. Depending upon the equipment, it can be manufactured in any width but boards of 6 to 18 inches wide and having a thicknesses of around 2 inches are ideal for the mats for the present invention.

The advantages of Miura boards include that is has the aesthetic appeal of wood, provides a non-slip surface, is non-swelling in contact with water, has high impact resistance, and can be cut, drilled and sanded like wood. It also can be cut with a water jet or a laser. Miura board does not exhibit grain nor veining and does not splinter or split. No sawdust is generated during cutting operations and instead, only burr is generated. It is immune to thermites, insects, molds and mildew, is also an excellent sound barrier and great thermal insulator. Miura boards do not contain PVC. They are not affected by UV rays and as such can be stored outdoors. The boards are also flame retardant and 100% recyclable.

Miura boards containing 30% fiber and 70% polymer have an average flexural strength of 4500 psi, a density of 65 lb/cu ft and a compressive strength of about 5000 psi. By incorporating a mineral charge, the density and compression strength can be proportionately increased when desired. It also has Izod impact resistance of a notched sample shows an impact strength of about 0.4 ft-lbs per inch notch. Thus, Miura boards are an ideal choice for use in the present invention. When used in the core layer, boards made of this material provide a long service life as they are protected from impact and abrasion by the hardwood boards of the top and base layers. It is also possible to use these boards in the top and base layers as when damaged they can be further recycled to reduce disposal of the removed and replaced components.

In addition to constructing the core layer of materials that are environmentally resistant, the boards of the core layer are constructed with increased strength compared to the outer layers. To increase strength, the boards are placed in side to side contact to minimize any space between the boards. Additionally, the sides of adjacent boards can be adhered together with an adhesive to assure that there is no open space that water can enter. It is usually sufficient to cut, plane, or mold the sides of the boards to facilitate abutting and complete side contact between adjacent boards. One way to do this is to provide the boards of the core layer with sides that are perpendicular to upper and lower surfaces and that have smooth surfaces to facilitate abutting and complete side contact between adjacent boards. Alternatively, adjacent boards of the core layer may have sides forming angles that are other than 90 degrees with respect to upper and lower board surfaces which are smoothed to facilitate abutting and complete side contact of adjacent boards. This results in a spacing of less than 0.25 and preferably 0.125" between adjacent boards. In the optimum situation, there is no space between adjacent boards. This is quite distinct from conventional mats that utilize a spacing of between 1 and 12" in the boards that are used for the core layer. And at the front and rear ends of the mat, the boards preferably have 90 degree sides to form with the upper and lower layers front and rear end faces of the mat.

The core layer thus is a solid or unitary structure that essentially has no openings passing through the core layer. The boards are held in abutting contact by the bolting arrangement that is used to connect the layers together. With no openings in the core layer as in conventional laminated mats, any water on the top layer can channel off quickly through the spaced openings between the boards of the top layer. The quick channeling of water reduces mud and debris from coming to the upper surface of the mat making it less muddy so that slipping and other accidents can be reduced. The elimination of openings in the core structure also prevents mud and debris from entering the core structure, and this results in less debris to clean between usage of the mat saving money on cleaning charges. The reduction of mud and debris in the mat also results in less debris falling off the mats as they are transported on trucks. These huge problems in the mat world are eliminated or at least substantially reduced by the present mat construction.

The top layer will typically include conventional boards made of any type of wood with oak being the most preferred. They may also be made of engineered wood or lumber since that will be easier to make long lengths without having to obtain one piece virgin wood lengths. Additionally, an engineered wood of a layered veneer laminate can also be used for these boards. It is expected that the cost for that material would be about the same as the price for oak thus making it an attractive alternative.

Engineered wood (or engineered lumber) includes a range of derivative wood products which are manufactured by binding or fixing the strands, particles, fibers, or veneers or boards of wood, together with adhesives, or other methods of fixation to form wood composite materials. These materials provide the surprising benefit of repeatable consistency of the required sizes, the ability to mix different wood species to arrive at the final product, and exceptional properties generally exceeding what is provided from monolithic boards.

There are three types of engineered wood that can be used in the present invention:
  parallel strand laminate (PSL), which is a beam that can be manufactured up to about 12×12 inches in any length due to the production of the beam by a continuous process;

layered stand laminate (LSL), which is a billet that can be made at thicknesses of from about 1" to 4", in widths from about 2 inches to 54", and in lengths of about 8 feet to 64 feet; and layered veneer laminate (LVL) which is also a billet that can be made up to about 4 feet square by any length.

While the beams are typically made of wood, as noted other materials may instead be used to further increase the service life of the overall mat. Plastic or elastomeric boards as disclosed for use in the core layer can be used in the top layer. This would include any of those specific materials mentioned herein with Miura board being a preferred choice. These boards would be spaced to provide water runoff channels.

The base layer is constructed in the same way as the top layer so that it also provides the same advantages when the base layer is used as the upper surface of the mat. And both the base and top layers when placed on the ground hold to the ground better and reduces or provides less impact on the native top soil.

In the core layer, the preferred construction will utilize full 2"×12" boards pushed together, whether these boards are made out of a treated softwood such as treated pine or a plastic material which is preferably engineered recycled board that contains rice hulls or recycled plastic fibers and a polymer such as HDPE. For optimum strength of the core layer, the width of the boards in that layer is about 25 to 70% greater that the width of the boards in the top and base layers. The use of core boards that are about 50% greater in width than the top and/or base boards has been found to be acceptable for most laminated mats. Thus, the preferred use of boards of a full 2"×12" (or wider) when butted together, provides greater strength that the boards of the upper and lower layers which mostly are about 1⅞"×7" or 8" with gaps from 1.5" to 2.5" between adjacent boards. By butting the boards together in the middle the mats become stronger and hold together better, and also offset the tendency of a mat that has all layers of spaced boards to experience loosening of the boards due to the gaps and spacing between the boards, which can cause distortion of the mats into a diamond like (rather than rectangular) shape which is a significant disadvantage when moving and installing or removing the mats. This is a huge benefit in that installation or recovery times are substantially reduced without having to deal with the straightening of the distorted mats.

In one particular embodiment, the boards in the top and base layers each have a thickness of between 1.5 and 2.5 inches, a width of between 6 and 9 inches and a spacing between adjacent boards of between 1.5 and 2.5 inches, while the boards in the core layer have a thickness between 1.5 and 2.5 inches and a width of between 8 and 14 inches. Additionally, each board in the top and base layers preferably has the same dimensions, while each board in the core layer preferably has the same dimensions, with the width of the boards in the core layer, as noted, being about 25 to 70% greater than the width of the boards in the top and base layers.

In another preferred embodiment, the mat has a width of about 8 feet and a length of about 12 to about 16 feet, with eleven boards in each of the top and base layers with the boards having a width of 7 to 8 inches, and with 12 to 24 boards in the core layer, each having a length of about 8 feet and a width of 8 to 12 inches. In yet another preferred embodiment, the mat has a width of about 8 feet and a length of about 12 to about 16 feet, with seven boards in each of the top and base layers with the boards having a width of 12 to 15 inches, and with 12 to 24 boards in the core layer each having a length of about 8 feet and a width of 8 to 12 inches. In these embodiments, the boards each have a thickness of between 1.5 and 2.5 inches.

The laminated mats of the invention can include one or more additional core layers so that the mat has a total of 4, 5, 6 or 7 layers of boards. The additional core layers comprise a plurality of parallel boards of substantially equal length that are made of chemically treated softwood, encapsulated softwood, or of plastic or elastomeric materials, with the boards extending between the first and second ends of the top layer, arranged to be parallel or perpendicular to the boards of the core layer, and configured so that adjacent boards in the additional core layers engage, contact and abut each other such that any space between adjacent boards is minimized to further improve the strength of the core layer. The boards of the top and base layers are the only ones that have spacing between them while adjacent boards in the other layers are in contact.

An odd or even number of additional core layers can be provided as desired. When an even number of layers is provided, it is preferred that each two additional core layers are provided with the boards in one additional layer arranged to be parallel to the boards of the initial core layer and with the boards in the other additional layer arranged to be perpendicular to the boards of the initial core layer, with the parallel boards being located between the core layers that include perpendicular boards. This results in alternating core layers where one has boards that are perpendicular to those of the top layer and an adjacent core layer has boards that are parallel to those of the top layer. One, two, three, or four additional layers are typically provided as necessary for the intended use of the laminated mat.

The various layers of the mat can be joined together in any one of a number of ways, but the preferred way is to use nails, screws, nuts and bolts or similar mechanical fasteners. The use of nuts and bolts is optimum to hold the boards of the top and base layers to the core layer as this facilitates the removal of worn or damaged boards while reusing the core layer and bolting to attach the replacement boards.

To assist in transporting and installing these mats, one or more lifting elements are preferably attached to one or more of the boards of the top or base layers. The mats are symmetrical such that either the base or top layer can be placed against the ground as with the top or base layer is configured to receive construction equipment thereon or to allow movement of construction equipment over the surface. The lifting elements disclosed in U.S. Pat. No. 9,714,487 B2 are entirely suitable, and that document is expressly incorporated herein by reference thereto.

To join adjacent mats together the front end of the mats includes a number of boards that are offset from the others to form tabs while at the rear end of the mat, the offset boards result in an open-ended slot. In a preferred embodiment, three such tabs and slots are provided in the base layer. If desired, other layers that are oriented in the same direction as the base layer can include offset boards forming tabs and slots. And when side interlocking of the mats is desired, some of the boards of the perpendicular core layer can be offset to form tabs and slots on the sides of the mat. Typically, it is sufficient to provide just the front and rear ends of the mat with the tabs and slots although in providing a platform or floor it is helpful to also include side tabs and slots. For example, for a core layer that has 8 boards that are 8 inches wide, the $2^{nd}$, $4^{th}$ and $6^{th}$ boards or the $3^{rd}$ and $5^{th}$ boards can be offset to form the tabs and slots for interconnection of adjacent mats. These interlocking features are further illustrated in the drawings as well as in U.S. Pat. Nos.

4,462,712 and 5,822,944, the contents of each of which is expressly incorporated herein by reference to the extent necessary to more fully understand these features of the invention.

Figure 2:
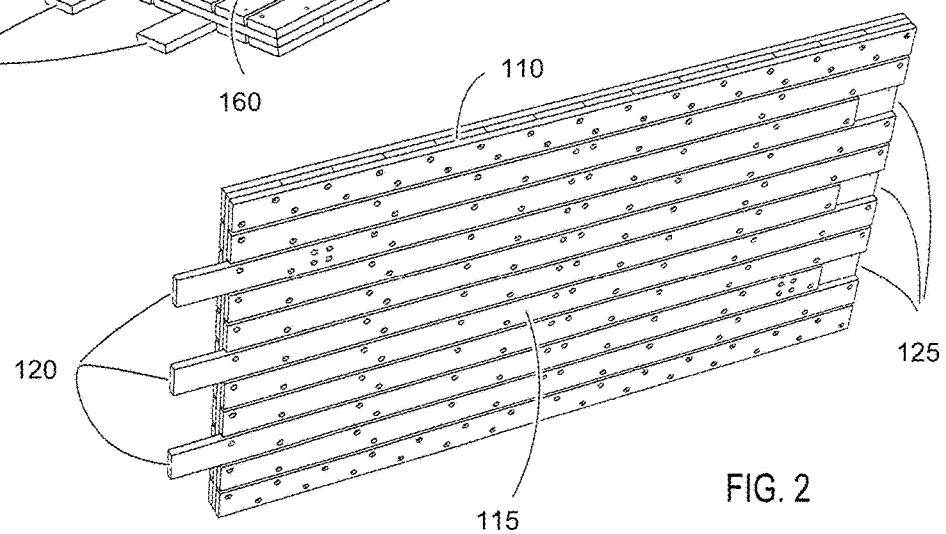
FIG. 2 is a bottom perspective view of the mat of FIG. 1.
Figure 3:
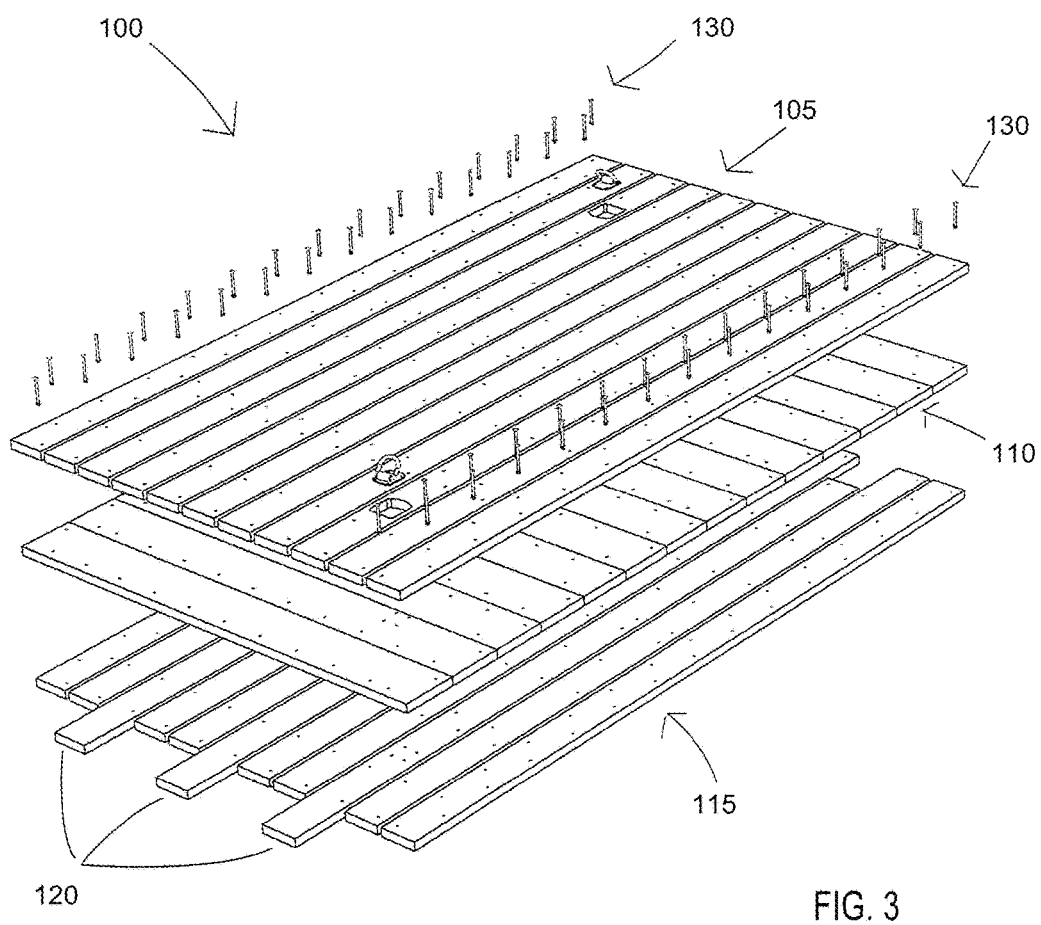
FIG. 3 is an exploded view of the mat of FIG. 1.

Turing now to the drawings, FIGS. 1-3 illustrate a three ply laminating interlocking mat 100 that is approximately 8 feet wide by 12 feet long by 6 inches thick. The top layer 105 includes 11 boards that are approximately 8 inches wide, 2 inches thick and 12 feet long. The full length of the board is made from virgin hardwood, e.g., oak, without joints or interconnections to provide boards of the required length. The core layer 110 uses boards that are 12 inches wide by 2 inches thick and 8 feet long, and are assembled such that there are no gaps between adjacent boards. The base layer 115, like the top layer, includes 11 boards of the same size as the top layer, except the third, sixth and ninth boards are offset from the others to form tab members 120 that extend from the forward end of the mat. These tab members 120 engage slots 125 at the rear end of the mat to allow interconnection of adjacent mats to form, for example, a roadway of a plurality of interconnected front to rear mats.

As shown, the boards are connected to each other through the use of bolting 130 that passes through the boards of each layer to adhere them in place with nuts engaging the bottom of the bolts that passes through the boards of the base layer. In that layer, the base boards can include recesses to receive the nuts so that they do not stick out past the bottom surface of the mat.

Figure 4:
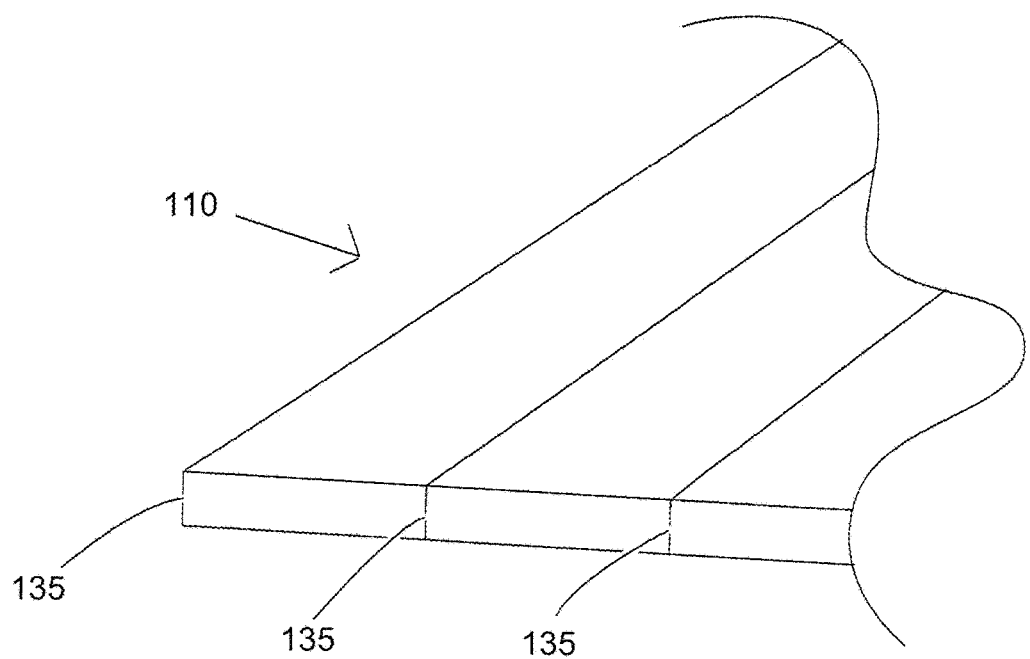
FIG. 4 is a perspective view of a first preferred construction for the core layer of a three layer laminated mat in accordance with the present invention.

FIG. 4 illustrates one preferred arrangement of the boards of the core layer 110. The boards are provided with a rectangular configuration with sides 135 that are precisely perpendicular to the top and bottom surfaces of the boards. When the boards are made of pine, the sides and top can be planed or cut to this configuration with tolerances on the order of 0.1 inches. When the boards are made of plastic or elastomers, they are molded to the same shape with similar tolerances. This allows the smooth sides of the boards to abut each other with a minimum of space between them. As noted herein, the space is less than about 0.1 inch and prevents moisture, mud or debris from entering into the spaces between the boards of the core layer.

Figure 5:
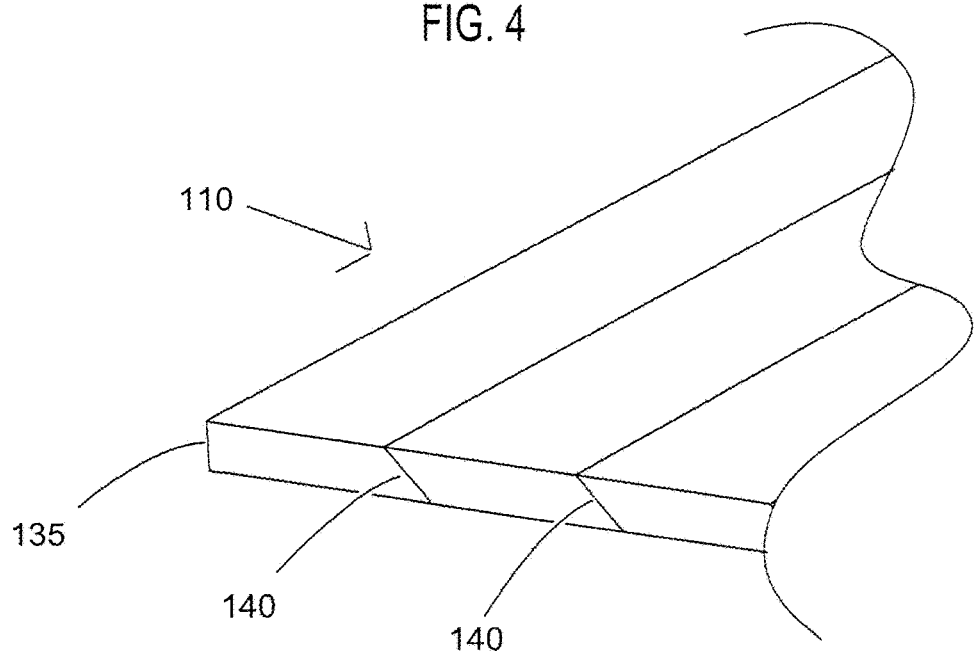
FIG. 5 is a perspective view of another preferred construction for the core layer of a three layer laminated mat in accordance with the present invention.

FIG. 5 illustrates a variation of the core layer where the boards have angled sides 140 which are approximately 60° with respect to the bottom surface of the board and conversely 120° from the top surface of the board. These angled sides are provided only on the board sides that contact an adjacent board with the first and last board of the core layer including a 90° side wall 135 so that those sides of the boards line up with at the boards of the other layers at the front and rear end of the mat. Again these sides are cut, planed or molded to be smooth and have a very tight tolerance to minimize entry of any moisture or debris into the spaces between the boards.

Figure 6:
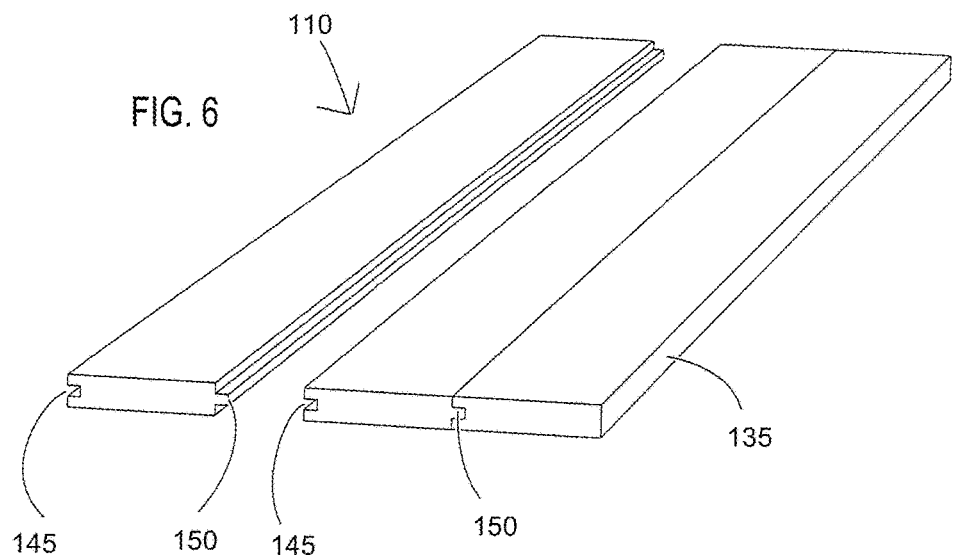
FIG. 6 is a perspective view of yet another preferred construction for the core layer of a three layer laminated mat in accordance with the present invention.

FIG. 6 illustrates yet another variation of the core layer 110 where one side of the boards has an elongated groove 145 and the side of the adjacent board has an elongated protrusion 150 that fits into the groove. This forms a tongue in groove joint that more securely joins the boards together. Instead of an elongated protrusion, a plurality of shorter protrusions can be provided. Also, a plurality of shorter grooves can be used with the shorter protrusions. The simpler construction is to use a single elongated groove extending for at least 25% to 75% or more of the length of the side of the board, with a protrusion on the adjacent board of similar length. And like FIG. 5, the grooves and protrusions are provided only on the board sides that are to contact each other with the first and last board of the core layer including a 90° side wall 135 so that those sides of the boards line up with at the boards of the other layers at the front and rear end of the mat. This construction also minimizes entry of any moisture or debris into the spaces between the boards.

And for the most secure arrangement, for the core layer, the sides of abutting boards shown in FIGS. 4-6 can be glued together with a suitable adhesive to completely eliminate any spacing between the boards.

In some embodiments, it is also possible to use wider boards for the top and base layers. These boards would have a width that is about 8 inches, with only 7 spaced boards in each of the top and base layers. The spacing would be about 2 inches. The $3^{rd}$ and $5^{th}$ boards can be offset to form the tabs and slots for interconnection of adjacent mats. For these embodiments, the core layer can include boards of the same width or of larger widths as disclosed herein.

Figure 7:
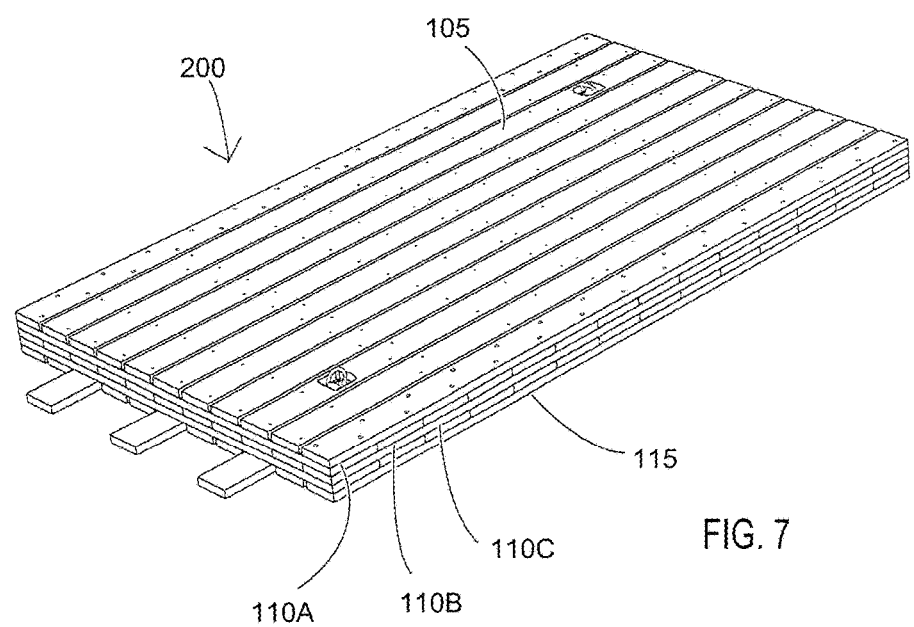
FIG. 7 is a top perspective view of a five layer laminated mat in accordance with the present invention.
Figure 8:
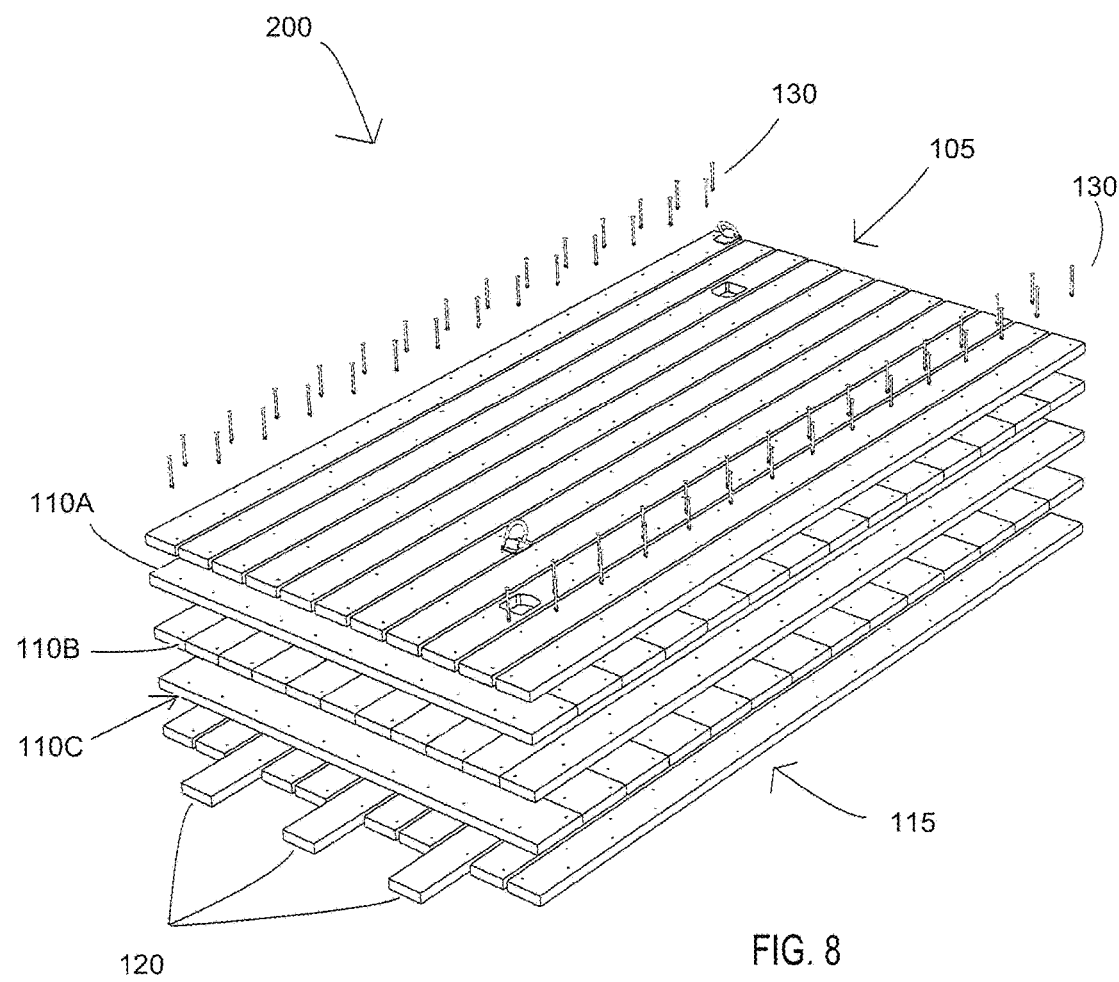
FIG. 8 is an exploded view of the mat of FIG. 7.

FIGS. 7-8 illustrate another laminated mat 200 according to the present invention, with the mat including 5 total layers, including top layer 105, base layer 115 and core layers 110A, 110B and 110C. Core layers 110A and 110C are the same as core layer 110 of FIGS. 1-3, with abutting boards arranged perpendicular to the boards in the top 105 and base 115 layers. Core layer 110B is located between core layers 110A and 110C, and has boards that are arranged at a different angle. While essentially any angle between 1 and 90 degrees can be used, it is convenient to arrange the boards in core layer 110B to be parallel to those of the top 105 and base 115 layers. And the boards in core layer 110B can be spaced if desired as shown in the top and bottom layers 105, 115, but preferably they abut each other just like the boards of core layers 110A and 110C as shown.

In additional embodiments of the invention, further core layers can be provided. Additional core layers 110B and 110C can be added to form a seven or nine layer mat. It is also possible to add a sheet of plywood or other wood sheets between core layers 110A or 110C and the respective top 105 or base 115 layers. And instead of a wood sheet, a metal sheet or plate can be used for the most rigorous mat uses.

If desired, an additional top layer or base layer or both can be provided. The additional top and/or base layers can be provided at any angle to the boards in the top 105 and base 115 layers. They also can be applied in a way to form threads for vehicle tires or tracks, walkways or equipment platforms or other incomplete surface coverage areas on the top or base layer.

An alternative size for the boards used in the mats of the invention is where the boards used in the core layer have a width of about 14 inches which is 75% greater than the width of the boards of the top and base layers. The mat would be 8 feet wide and 14 feet long. The eleven boards of the top layer 105 and base layer 115 are as shown in FIG. 1 with each being slightly less than 8 inches wide and having a spacing of about 1.5 inch between adjacent boards. As noted, the boards in the core layer abut each other with essentially no space between.

Another embodiment of the present invention is a method for prolonging the service life of a laminated mat that has wood components. This method comprises: configuring the mat to have a reusable core layer that provides strength and rigidity to the mat, wherein the core layer is provided as an integral unit of a plurality of parallel boards of substantially equal length that are made of chemically treated softwood, encapsulated softwood, or of plastic or elastomeric materials, with the boards extending between the first and second ends of the top layer, arranged to be perpendicular to the boards of the top layer, and configured so that adjacent boards in the core layer engage, contact and abut each other to minimize or eliminate space between adjacent boards to improve the strength of the core layer; providing top and base layers attached to the core layer directly or indirectly through additional layers, with the top and base layers forming upper and lower surfaces of the mat, wherein the top and base layers each comprises a plurality of parallel boards of substantially equal length that are spaced from each other and are made of oak or other hardwoods, or of plastic or elastomeric materials; removably attaching the boards of the top and base layers to the reusable core layer by a bolting arrangement; and renewing the mat by replacing boards of the top and base layers that are damaged or deteriorated during use by removing one or more of the damaged or deteriorated boards while reusing the core layer to form a renewed mat having the core layer with one or more replaced boards in the top or base layers, thus providing a prolonged service life for the mat.

Any of the mat structures disclosed herein can be used in this method. Advantageously, the boards of the top or base layers are removable by loosening the bolting arrangement and by attaching the replacement boards to the core layer using the same bolting arrangement. Also, the mats can be provided with offsetting boards as described herein so that the mats can be installed by front to rear engagement of the tabs and slots of adjacent mats.

And while offsetting of certain boards is shown for providing an interlocking with adjacent mats, this is not always needed such that interlocking can be considered to be an optional yet desirable feature. Interlocking is often preferred to avoid staking of the mats to the ground or to avoid including other more complex components for use in connecting adjacent mats together. As noted, interlocking is generally provided on the front and rear ends of the mat but in certain situations interlocking can be provided on all four sides of the mat to obtain a wider interlocked base structure.

FIGS. 1-2 illustrates the inclusion of lifting elements 150 that are provided on the third and ninth boards of the top layer. These lifting elements 150 are configured as D shaped rings which are attached to the boards in recesses 170 so that the lifting element 150 can remain flat when the mat 100 is in use. The lifting elements are secured in the mat by bolting which extends through all of the layers of the mat from the top layer 105 to the base layer 115. Two lifting elements are shown but a skilled artisan can determine how many elements are needed for lifting of any particularly sized mat. If desired, lifting elements can also be provided on the boards attached to the base layer 115 for versatility in the handling and transportation of the mat. The lifting elements are provided on the boards that can be easily removed and replaced if the boards or even if the lifting elements are damaged during use.

Another feature of the invention is the use of color coding to identify the core construction of the mat. As the encapsulation is opaque, it is not possible to visually determine how the core is made. Thus, a color coding system can be used to identify the specific core construction. This can also be used to identify mats for a particular customer or end user. When mats are rented or leased, the color coding can be used to identify which mats belong to the leasing company compared to mats provided by others. The color coding can be of a single color or of certain stripes, patterns, dots or other indicia that provides a "signature" that identifies the specific core that is present in the mat or a particular end user or owner of the mat.

All of the mats according to the invention are to be installed on a prepared ground surface so that they will perform acceptably. Ground preparation is typically upon a material of uniform flatness (e.g., within ±12" over an 8'×14' surface). Crushed stone or rock generally no larger than 4" diameter is acceptable for preparing the ground as a substrate for supporting the mats.

All mats according to the invention that include the most preferred core construction or alternatives thereof are designed to meet the following product specifications for preferred implementations as temporary roadways, equipment support surfaces, platforms and similar applications. A further benefit of the mats of the invention is that they do not cause contamination of the ground surfaces upon which they are applied.

The spacing between boards in the top layer is preferably at least 1.25" to allow water to drain from the mat. The slip resistance of the mat is improved by the draining of the excess water, especially when use in locations that experience heavy rain or snow conditions.

The preferred mats have physical properties that meet or exceed the physical properties of a conventional white oak mat.

The mat must also provide sufficient load bearing capacity: a fully supported mat (one that is properly installed on an approved ground surface preparation) must withstand a 10 ton load, spread over a 12" diameter surface without degradation of mat properties or permanent deformation of core construction of the mat. The core would have a crush resistance of between about 600 and 800 psi depending upon the application. This provides resistance against compression while not detracting from providing resistance to torsion forces that applied to the mat by vehicles passing thereover.

A number of additional features may be provided in any of the mats of the present invention. A radio frequency identification (RFID) tag can be embedded into the access mats in a routered pocket in the core construction to enable the access mats to be monitored in an inventory system or when rented for use. The tag provides a unique identification serial number for each mat, such that the mats which are being used or rented can be tracked and accounted for as to location of use. The mats can be scanned when in a warehouse, when loaded on trucks for delivery, when delivered to a job site, or when collected from a jobsite after use. The RFID tags can be active or passive and if desired, other tracking devices such as barcodes could similarly be for the same purposes. It is preferred, however, that the RFID tag be embedded in the mat so that it is protected from damage by the skin that encapsulates the mat. When a barcode or other surface mounted tag or indicia is used, it should be placed on a surface portion of the mat that is less likely to experience wear or abuse. Thus, the tag may preferably be applied onto the side of the mat so that it is not directed exposed to traffic on the mat.

In order to manipulate the mats for loading/unloading, or moving from one location to another or for installation and retrieval, the mats can include a retractable lifting element. This can be the lifting elements described above and those elements lie in a recess in the top surface of the mat during use for ease of access and to prevent tripping or damage to items moving over the mat or damage to the lifting elements themselves. Alternatively, a more complicated design such as that of US patent publication 2008/0292397 can be used. And if a simpler variation is needed, a chain or cable can be provided in a hole that passes through all layers of the mat. Such chain or cable allows the mat to be lifted from a hook that engages the lifting element from either the surface of the top or base layer. And multiple lifting elements can be provided if desired.

To assist in the use of the mat during the night or on days that are dark due to poor weather conditions, the mat may include one or more lighting elements, such as those disclosed in International application WO 2006/048654. For an encapsulated mat, these lighting elements would preferably be embedded in the skin. The skin can be provided of clear plastic, so that the lighting element may be positioned below the skin for better protection of the lighting element during use. As the embedding of the lighting element below the skin surface can result in reduced luminosity, a skilled artisan can best determine the appropriate location for the placement of the lighting element in or under the skin and for providing the skin of the appropriate color or clarity to achieve the desired lighting brightness. This can also be adjusted by providing a larger number of lighting elements or of lighting elements of larger size.

Therefore, in sum, it is to be realized the optimum dimensional relationships for the parts of the invention can include variations and tolerances in size, materials, shape, form, function and use are deemed readily apparent and obvious to the skilled artisan, and all equivalent relationships to those illustrated in the drawings and described in the specification are intended to be encompassed by the claims appended hereto.

Unless defined otherwise, all technical and scientific terms used herein have same meaning as commonly understood by one of ordinary skill in the art to which this invention belongs. Also, as used herein and in the appended claims, the singular form "a", "and", and "the" include plural referents unless the context clearly dictates otherwise. All technical and scientific terms used herein have the same meaning.

The foregoing detailed description is considered as illustrative only of the principles of the invention. Further, since numerous modifications and changes will readily be apparent to those having ordinary skill in the art, it is not desired to limit the invention to the exact constructions demonstrated. In particular, it would be understood that the various sizes, materials, configurations and arrangements disclosed herein may be combined and constructed in any way that is feasible to create a hybrid may for any particular end use. Accordingly, all suitable modifications and equivalents may be resorted to falling within the scope of the appended claims.

What is claimed is:

1. A laminated mat for use as the temporary surface at a construction site or roadway leading thereto and adapted for supporting construction equipment, the mat including at least three layers of boards comprising:
   a rectangular top layer having a first end and an opposed second end, with the top layer base comprising a plurality of parallel boards of substantially equal length that are spaced from each other and are made of oak or other hardwoods, engineered wood or of plastic or elastomeric materials;
   a rectangular core layer comprising a plurality of parallel boards of substantially equal length that are made of chemically treated softwood, encapsulated softwood, or of plastic or elastomeric materials, with the boards extending between the first and second ends of the top layer, arranged to be perpendicular to the boards of the top layer, and having sides configured so that adjacent boards in the core layer engage, contact and abut each other with tolerances of 0.1 inches or less to minimize or eliminate space between adjacent boards to improve the strength of the core layer, wherein the boards of the core layer have sides that are perpendicular to upper and lower surfaces of the boards to facilitate abutting and complete side contact between adjacent boards; and
   a rectangular base layer having a first end and an opposed second end which are aligned with the first and second ends of the top layer, with the base layer comprising a plurality of parallel boards of substantially equal length that are spaced from each other and are made of oak or other hardwoods, engineered wood or of plastic or elastomeric materials, with the boards of the base layer oriented parallel to the boards of the top layer and perpendicular to the boards of the core layer;
   wherein at least two or three boards of the base layer are longitudinally offset to the other boards to form at a first end of the mat having two or three protruding board ends and to correspondingly form at a second end of the mat two or three open slots such that the protruding board ends of one mat can engage the open slots of a similarly configured longitudinally adjacent mat to interlock the mats together to form the temporary surface at the construction site;
   wherein the mat has a width of between about 4 feet and about 12 feet and a length of between about 10 and about 60 feet, wherein the boards are removably attached together by bolting or other fasteners, and wherein all boards in the mat have a thickness of between about 1 and about 4 inches and a width of between about 4 and about 16 inches, while the boards in the top and base layers have a length that is the same as the length of the mat.

2. The laminated mat of claim 1 wherein the boards of the core layer have sides that are cut, planed, or molded to facilitate abutting and complete side contact between adjacent boards.

3. The laminated mat of claim 1 wherein adjacent boards of the core layer have sides that are adhered together by an adhesive.

4. The laminated mat of claim 1 wherein each board in the core layer is rectangular and is made of treated pine that is pressure treated with chemical preservatives that resist rot, decay and termites and wherein the top and base layers include rectangular boards made of oak.

5. The laminated mat of claim 1 wherein each board in the core layer is made of recycled plastic material comprising rice hulls and polyethylene and wherein the top and base layers include rectangular boards made of oak.

6. The laminated mat of claim 1 wherein each board in the core layer is rectangular and is made of treated pine that is pressure treated with one or more chemical preservatives that resist rot, decay and termites and wherein the top and base layers include rectangular boards made of recycled plastic material comprising a polymer and rice hulls or recycled plastic carpet fibers.

7. The laminated mat of claim 1 wherein the boards in the top and base layers each have a thickness of between 1.5 and 2.5 inches, a width of between 6 and 9 inches and a spacing between adjacent boards of between 1.5 and 2.5 inches, while the boards in the core layer have a thickness between 1.5 and 2.5 inches and a width of between 8 and 14 inches.

8. The laminated mat of claim 7, wherein each board in the top and base layers has the same dimensions, each board in the core layer has the same dimensions, and the width of the boards in the core layer is about 25 to 70% greater than the width of the boards in the top and base layers.

9. The laminated mat of claim 8 having a width of about 8 feet and a length of about 12 to about 16 feet, with eleven boards in each of the top and base layers with the boards having a width of 7 to 8 inches, and with 12 to 24 boards in the core layer, each having a length of about 8 feet and a width of 8 to 12 inches.

10. The laminated mat of claim 8 having a width of about 8 feet and a length of about 12 to about 16 feet, with seven boards in each of the top and base layers with the boards having a width of 12 to 15 inches, and with 12 to 24 boards in the core layer each having a length of about 8 feet and a width of 8 to 12 inches.

11. The laminated mat of claim 1 which further comprises one or more additional core layers comprising a plurality of parallel boards of substantially equal length that are made of chemically treated softwood, encapsulated softwood, or of plastic or elastomeric materials, with the boards extending between the first and second ends of the top layer, arranged to be parallel or perpendicular to the boards of the core layer, and configured so that adjacent boards in the core layer engage, contact and abut each other to minimize or eliminate space between adjacent boards to improve the strength of the core layer.

12. The laminated mat of claim 10 wherein two additional core layers are provided with the boards in a first additional core layer arranged to be perpendicular to the boards of the core layer and with the boards in a second additional layer arranged to be parallel to the boards of the core layer with the parallel boards being located between the core layers that include the perpendicular boards.

13. The laminated mat of claim 1 further comprising one or more lifting elements attached to one or more of the boards of the top or base layers.

14. A method for prolonging the service life of a laminated mat that has wood components, which comprises: configuring the mat to have a reusable core layer that provides strength and rigidity to the mat, wherein the core layer is provided as an integral unit of a plurality of parallel boards of substantially equal length that are made of chemically treated softwood, encapsulated softwood, or of plastic or elastomeric materials, with the boards extending between the first and second ends of the top layer, arranged to be perpendicular to the boards of the top layer, and having sides configured so that adjacent boards in the core layer engage, contact and abut each other with tolerances of 0.1 inches or less to minimize or eliminate space between adjacent boards to improve the strength of the core layer, and with the boards of the core layer having sides that are perpendicular to upper and lower surfaces of the boards to facilitate abutting and complete side contact between adjacent boards; providing top and base layers attached to the core layer directly or indirectly through additional layers, with the top and base layers forming upper and lower surfaces of the mat, wherein the top and base layers each comprises a plurality of parallel boards of substantially equal length that are spaced from each other and are made of oak or other hardwoods, or of plastic or elastomeric materials, and wherein all boards in the mat have a thickness of between about 1 and about 4 inches and a width of between about 4 and about 16 inches; removably attaching the boards of the top and base layers to the reusable core layer by a bolting arrangement; and renewing the mat by replacing boards of the top and base layers that are damaged or deteriorated during use by removing one or more of the damaged or deteriorated boards while reusing the core layer to form a renewed mat having the core layer with one or more replaced boards in the top or base layers, thus providing a prolonged service life for the mat.

15. The method of claim 14, wherein the boards of the top or base layers are removable by loosening the bolting arrangement and by attaching the replacement boards to the core layer using the same bolting arrangement.

16. A laminated mat for use as the temporary surface at a construction site or roadway leading thereto and adapted for supporting construction equipment, the mat including at least three layers of boards comprising:
a rectangular top layer having a first end and an opposed second end, with the top layer base comprising a plurality of parallel boards of substantially equal length that are spaced from each other and are made of oak or other hardwoods, engineered wood or of plastic or elastomeric materials;
a rectangular core layer comprising a plurality of parallel boards of substantially equal length that are made of chemically treated softwood, encapsulated softwood, or of plastic or elastomeric materials, with the boards extending between the first and second ends of the top layer, arranged to be perpendicular to the boards of the top layer, and having sides configured so that adjacent boards in the core layer engage, contact and abut each other with tolerances of 0.1 inches or less to minimize or eliminate space between adjacent boards to improve the strength of the core layer; and
a rectangular base layer having a first end and an opposed second end which are aligned with the first and second ends of the top layer, with the base layer comprising a plurality of parallel boards of substantially equal length that are spaced from each other and are made of oak or other hardwoods, engineered wood or of plastic or elastomeric materials, with the boards of the base layer oriented parallel to the boards of the top layer and perpendicular to the boards of the core layer;
wherein the boards in the top and base layers each have a thickness of between 1.5 and 2.5 inches, a width of between 6 and 9 inches and a spacing between adjacent boards of between 1.5 and 2.5 inches, while the boards in the core layer have a thickness between 1.5 and 2.5 inches, a width of between 8 and 14 inches and complete side to side contact with any space between them being sufficient to prevent moisture, mud or debris from entering between the boards, with the boards of the core layer having sides that are perpendicular to upper and lower surfaces of the boards to facilitate abutting and complete side contact between adjacent boards;
wherein at least two or three boards of the base layer are longitudinally offset to the other boards to form at a first end of the mat having two or three protruding board ends and to correspondingly form at a second end of the mat two or three open slots such that the protruding board ends of one mat can engage the open slots of a similarly configured longitudinally adjacent mat to interlock the mats together to form the temporary surface at the construction site; and
wherein the mat has a width of between about 4 feet and about 12 feet and a length of between about 10 and about 60 feet, wherein the boards are removably attached together by bolting or other fasteners.

17. The laminated mat of claim 16 having a width of about 8 feet and a length of about 12 to about 16 feet, wherein each board in the top and base layers has the same dimensions, each board in the core layer has the same dimensions, and the width of the boards in the core layer is greater than the width of the boards in the top and base layers, with either eleven boards in each of the top and base layers with the boards having a width of 7 to 8 inches, and with 12 to 24 boards in the core layer, each having a length of about 8 feet and a width of 8 to 12 inches, or with seven boards in each of the top and base layers with the boards having a width of 12 to 15 inches, and with 12 to 24 boards in the core layer each having a length of about 8 feet and a width of 8 to 12 inches.

18. A laminated mat for use as the temporary surface at a construction site or roadway leading thereto and adapted for supporting construction equipment, the mat including at least three layers of boards comprising:

a rectangular top layer having a first end and an opposed second end, with the top layer base comprising a plurality of parallel boards of substantially equal length that are spaced from each other and are made of oak or other hardwoods, engineered wood or of plastic or elastomeric materials;

a rectangular core layer comprising a plurality of parallel boards of substantially equal length that are made of chemically treated softwood, encapsulated softwood, or of plastic or elastomeric materials, with the boards extending between the first and second ends of the top layer, arranged to be perpendicular to the boards of the top layer, and having sides configured so that adjacent boards in the core layer engage, contact and abut each other with tolerances of 0.1 inches or less to minimize or eliminate space between adjacent boards to improve the strength of the core layer, wherein adjacent boards of the core layer have sides forming angles that are other than 90 degrees with respect to upper and lower board surfaces to facilitate abutting and complete side contact of adjacent boards, with boards of the core layer of the mat optionally having 90 degree sides at the first and second ends of the mat; and a rectangular base layer having a first end and an opposed second end which are aligned with the first and second ends of the top layer, with the base layer comprising a plurality of parallel boards of substantially equal length that are spaced from each other and are made of oak or other hardwoods, engineered wood or of plastic or elastomeric materials, with the boards of the base layer oriented parallel to the boards of the top layer and perpendicular to the boards of the core layer;

wherein at least two or three boards of the base layer are longitudinally offset to the other boards to form at a first end of the mat having two or three protruding board ends and to correspondingly form at a second end of the mat two or three open slots such that the protruding board ends of one mat can engage the open slots of a similarly configured longitudinally adjacent mat to interlock the mats together to form the temporary surface at the construction site;

wherein the mat has a width of between about 4 feet and about 12 feet and a length of between about 10 and about 60 feet, wherein the boards are removably attached together by bolting or other fasteners, and wherein all boards in the mat have a thickness of between about 1 and about 4 inches and a width of between about 4 and about 16 inches, while the boards in the top and base layers have a length that is the same as the length of the mat.

19. The laminated mat of claim 18, wherein the boards in the top and base layers each have a thickness of between 1.5 and 2.5 inches, a width of between 6 and 9 inches and a spacing between adjacent boards of between 1.5 and 2.5 inches, while the boards in the core layer have a thickness between 1.5 and 2.5 inches, a width of between 8 and 14 inches and complete side to side contact with any space between them being sufficient to prevent moisture, mud or debris from entering between the boards, with the boards of the core layer having sides that are perpendicular to upper and lower surfaces of the boards to facilitate abutting and complete side contact between adjacent boards.

20. The laminated mat of claim 19 having a width of about 8 feet and a length of about 12 to about 16 feet, wherein each board in the top and base layers has the same dimensions, each board in the core layer has the same dimensions, and the width of the boards in the core layer is greater than the width of the boards in the top and base layers, with either eleven boards in each of the top and base layers with the boards having a width of 7 to 8 inches, and with 12 to 24 boards in the core layer, each having a length of about 8 feet and a width of 8 to 12 inches, or with seven boards in each of the top and base layers with the boards having a width of 12 to 15 inches, and with 12 to 24 boards in the core layer each having a length of about 8 feet and a width of 8 to 12 inches.

* * * * *